Oct. 10, 1939.   D. R. GOYETTE   2,175,191
ADJUSTABLE MOUTHPIECE FOR WIND MUSICAL INSTRUMENTS
Filed April 7, 1938
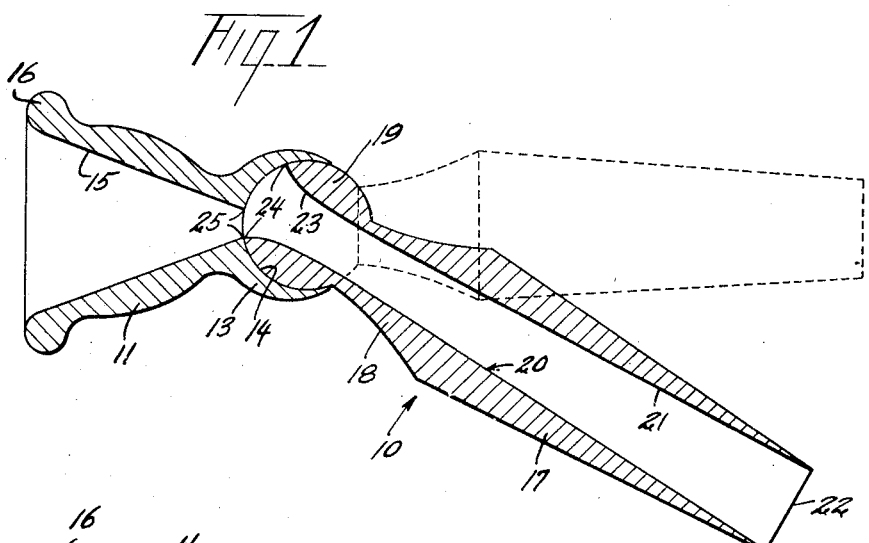
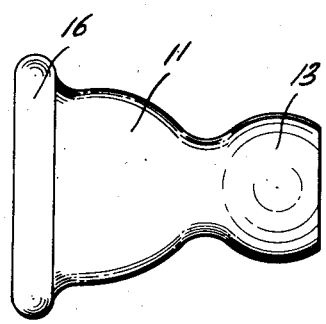
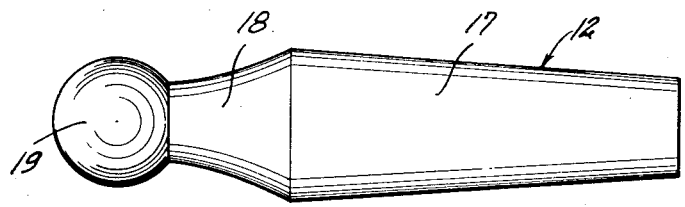
Inventor
David R. Goyette
By Carl Miller
Attorney Patented Oct. 10, 1939

2,175,191

UNITED STATES PATENT OFFICE 2,175,191

ADJUSTABLE MOUTHPIECE FOR WIND MUSICAL INSTRUMENTS

David R. Goyette, Eldorado Springs, Mo.

Application April 7, 1938, Serial No. 200,631

1 Claim. (Cl. 84—399)

This invention relates to new and useful improvements in adjustable mouthpieces for wind instruments such as trombones, cornets, trumpets and other various types of horns and the like.

The principal object of this invention is to provide an adjustable mouthpiece for wind instruments that will enable the player to hold an instrument equipped with such a mouthpiece at the correct angle without throwing back his head to raise the instrument as well as giving him an even pressure on both upper and lower lips. In other words, it is a primary object and purpose of the present invention to make an adjustable mouthpiece consisting of two swivelly connected parts one forming a lip engaging portion and the other a stem portion wherein the lip engaging portion may be adjusted to any desired position with respect to the stem portion which is connected to the instrument, the construction being such that the player may change position as desired during the performance of the selection played.

With the foregoing, and other objects in view, the invention consists in the novel and useful formation, construction, interrelation and combination of parts, all as hereinafter described, shown in the drawing and set forth in the claim.

In the drawing:

Figure 1 is a longitudinal sectional view of an improved mouthpiece made in accordance with this invention.

Figure 2 is an elevational view of the lip engaging portion of the mouthpiece.

Figure 3 is an elevational view of the stem portion of the mouthpiece.

Referring to the drawing in detail, the assembled adjustable mouthpiece 10 consists of a lip engaging number 11 and a stem 12.

Both the lip engaging portion 11 and stem 12 are made of metal or any other suitable material.

The lip engaging member 11, is formed at one end to provide a spherical knob 13 having a hollow spherical socket 14 to provide the socket portion of a ball and socket joint. Through the lip engaging member 11 there is an axially tapered bore 15, the smallest end of which communicates with the socket 14. The largest end of the bore 15 terminates at the other end of the member 11 which is formed at its periphery with an annular bead 16, that portion of the bead 16 and the adjacent surface of the bore 15 defining the lip engaging portion of the member 11.

The stem 12 is formed as an elongated member having a tapered stem portion 17, a reduced neck portion 18 and a spherical ball bead 19 adapted to snugly fit within the socket 14. Extending axially through the stem 12 is a bore 20 that is tapered as at 21 from the outer end 22 of the stem portion 17 to a point substantially in the plane of jointure of the neck portion 18 with the ball 19, and which bore is flared as at 23 outwardly through the ball 19. The flared bore portion 23 has a surface of convex curvature which smoothly merges into the uniform straight tapered bore surface 21 of the bore 20.

As will be observed the opening 24 formed in the ball 19 by the flared bore portion 23 is considerably greater than the size of the opening 25 at the tapered end of the bore 15 in the lip engaging member 11. This is so, that regardless of the angular position assumed between the lip engaging member 11 and the stem 17, the opening 25 will not be closed by the ball 19. Thus as shown in Figure 1, the stem 17 is at the maximum angular position the same may attain with reference to the lip engaging member 11 which preferably is 30 degrees with relation to the axis of the member 11, the opening 25 being unrestricted and in complete communication with the opening 24 of the stem bore 20.

The dotted line position of the stem 17 is the normal straight or co-axial position of the stem with reference to the member 11. Obviously in view of the ball and socket connection between the two parts 11 and 17 there is universal angular movement therebetween.

In the assembly of the ball 19 within the socket 14 any suitable method for achieving the same may be utilized. Preferably the assembly should be such that the ball 19 snugly fits within the socket 14 in friction tight relationship to obviate any play between the parts. By virtue of the shape of the bores 15 and 20 the adjustable mouthpiece will add from two to four notes to the higher tones making a full and richer tone in all the registers.

Other modifications in structure may be made without changing the invention, and all such as come within the scope of the appended claim defining the invention are to be considered as comprehended by the invention.

Having thus described my invention, I claim as new and desire to secure by Letters Patent:

A mouthpiece for wind musical instruments comprising a lip engaging member having a socket formed at one end thereof, and an elongated stem provided with a ball head adapted to snugly fit within said socket to form a ball and socket joint, an axial bore formed in said member and stem, the bore in said stem being flared outwardly in the ball head thereof and merging into a straight tapered bore portion diverging outwardly from the base of said ball head to the end of said stem remote from said ball head, and said bore in said lip engaging member being tapered and diverging outwardly from said socket to the outer end of said member, the terminal portions of said bores being of unequal size and in open unrestricted communication regardless of the angular relationship between said member and stem.

DAVID R. GOYETTE.